United States Patent
Wang (10) Patent No.: US 10,960,474 B2
(45) Date of Patent: Mar. 30, 2021

(54) POWER TOOL

(71) Applicants: Bosch Power Tools (China) Co., Ltd., Zhejiang (CN); Robert Bosch GmbH, Stuttgart (DE)

(72) Inventor: Jia Wang, Zhejiang (CN)

(73) Assignees: Bosch Power Tools (China) Co., Ltd., Zhejiang (CN); Robert Bosch GmbH, Stuttgart (DE)

(*) Notice: Subject to any disclaimer, the term of this patent is extended or adjusted under 35 U.S.C. 154(b) by 0 days.

(21) Appl. No.: 16/613,763

(22) PCT Filed: May 23, 2018

(86) PCT No.: PCT/CN2018/087955
§ 371 (c)(1),
(2) Date: Nov. 14, 2019

(87) PCT Pub. No.: WO2018/219184
PCT Pub. Date: Dec. 6, 2018

(65) Prior Publication Data
US 2020/0070265 A1    Mar. 5, 2020

(30) Foreign Application Priority Data
May 31, 2017 (CN) .......................... 201710397778.4

(51) Int. Cl.
*B23D 49/16* (2006.01)
*B23D 49/10* (2006.01)

(52) U.S. Cl.
CPC .......... *B23D 49/165* (2013.01); *B23D 49/10* (2013.01)

(58) Field of Classification Search
CPC ...... B23D 49/165; B23D 51/16; B23D 49/14; B25D 11/12; B25D 17/24; B25D 2217/0088
(Continued)

(56) References Cited

U.S. PATENT DOCUMENTS

| 1,464,570 A | 8/1923 | Hage |
| 3,309,932 A | 3/1967 | Davis |

(Continued)

FOREIGN PATENT DOCUMENTS

| CN | 1496772 A | 5/2004 |
| CN | 2671742 Y | 1/2005 |

(Continued)

OTHER PUBLICATIONS

International Search Report corresponding to PCT Application No. PCT/CN2018/087955, dated Jul. 18, 2018 (Chinese and English language document) (6 pages).

*Primary Examiner* — Sean M Michalski
(74) *Attorney, Agent, or Firm* — Maginot, Moore & Beck LLP (57) ABSTRACT

An electric tool includes a rotary wheel driven to rotate around a central axis thereof, an action member configured to bear a cutter of the electric tool, and a counterweight. The rotary wheel drives the action member such that it reciprocates linearly in a first direction. The rotary wheel simultaneously drives the counterweight such that it not only reciprocates linearly in the first direction in an opposite manner to the action member, but also performs reciprocating swinging movement in a plane perpendicular to the central axis. The first direction is parallel to the plane.

10 Claims, 4 Drawing Sheets

(58) Field of Classification Search
USPC .......................................................... 30/394
See application file for complete search history.

(56) References Cited

U.S. PATENT DOCUMENTS

| | | | | |
|---|---|---|---|---|
| 3,863,342 | A | 2/1975 | Griffies et al. | |
| 3,971,132 | A * | 7/1976 | Griffies | B23D 49/162 30/393 |
| 4,545,123 | A * | 10/1985 | Hartmann | B23D 49/167 30/393 |
| 4,628,605 | A * | 12/1986 | Clowers | B23D 49/165 30/393 |
| 4,991,664 | A * | 2/1991 | Kolgan | B25D 11/125 173/201 |
| 5,134,777 | A * | 8/1992 | Meyer | B23D 49/167 30/392 |
| 5,212,887 | A * | 5/1993 | Farmerie | B23D 49/165 30/392 |
| 5,782,000 | A * | 7/1998 | Bednar | B23D 51/16 30/392 |
| 5,860,218 | A * | 1/1999 | Vinciguerra | B23D 49/003 30/392 |
| 6,178,646 | B1 * | 1/2001 | Schnell | B23D 49/165 279/44 |
| RE37,211 | E * | 6/2001 | Bednar | B23D 49/162 30/392 |
| 6,508,151 | B1 * | 1/2003 | Neitzell | B23D 51/16 30/393 |
| 7,363,713 | B2 * | 4/2008 | Hirabayashi | B23D 51/16 30/392 |
| 7,549,361 | B2 * | 6/2009 | Ikoma | B26D 7/08 30/208 |
| 9,415,453 | B2 * | 8/2016 | Kobori | B23D 51/16 |
| 9,573,207 | B2 * | 2/2017 | Sugita | B23D 51/16 |
| 10,850,338 | B2 * | 12/2020 | Zheng | B23D 49/007 |
| 2004/0117993 | A1 * | 6/2004 | Armstrong | B23D 51/16 30/392 |
| 2006/0053631 | A1 * | 3/2006 | Fossella | B26B 5/001 30/165 |
| 2007/0214660 | A1 * | 9/2007 | Bone | B23D 49/165 30/392 |
| 2008/0189961 | A1 * | 8/2008 | Oberheim | B23D 49/165 30/393 |
| 2012/0192440 | A1 * | 8/2012 | Jerabek | B23D 51/16 30/393 |
| 2013/0019483 | A1 | 1/2013 | Naughton et al. | |
| 2015/0367494 | A1 * | 12/2015 | Wang | B25F 5/006 30/392 |
| 2016/0199924 | A1 * | 7/2016 | Haas | B23D 51/16 83/13 |
| 2018/0021867 | A1 * | 1/2018 | Naoi | B23D 49/162 30/394 |
| 2019/0224765 | A1 * | 7/2019 | Wang | B25F 5/001 |

FOREIGN PATENT DOCUMENTS

| | | |
|---|---|---|
| CN | 202398895 U | 8/2012 |
| CN | 103341666 A | 10/2013 |
| CN | 203254010 U | 10/2013 |
| CN | 104096910 A | 10/2014 |
| CN | 105465271 A | 4/2016 |
| DE | 299 12 907 U1 | 12/1999 |
| EP | 0 521 263 A1 | 1/1993 |
| EP | 1 407 847 A2 | 4/2004 |
| EP | 1 494 277 A2 | 1/2005 |
| EP | 1 980 351 A2 | 10/2008 |

* cited by examiner

POWER TOOL

This application is a 35 U.S.C. § 371 National Stage Application of PCT/CN2018/087955, filed on May 23, 2018, which claims the benefit of priority to Ser. No. CN 201710397778.4, filed on May 31, 2017 in China, the disclosures of which are incorporated herein by reference in their entirety.

BACKGROUND

The present application relates to the field of electric tools, in particular to an electric tool outputting reciprocating linear movement.

Common electric tools, such as reciprocating saws and electric hammers, comprise a drive means outputting rotational movement, an action means outputting reciprocating linear movement, and a movement conversion mechanism converting rotational movement of the drive means to reciprocating linear movement of the action means.

The action means of an electric tool of this type subjects a target workpiece to an operation such as reciprocating pounding or reciprocating cutting by performing reciprocating linear movement. When driven to perform reciprocating linear movement, the action means will change movement direction frequently. The action means frequently changing movement direction causes vibration in the electric tool due to the effect of inertia, thereby shortening the service life of the electric tool; it is also likely to result in the operator suffering physiological fatigue injury, and at the same time affects the comfort of the operator when operating the electric tool.

In order to reduce vibration in electric tools and thereby attain ideal operating performance, persons skilled in the art have already made great efforts.

For example, a jigsaw exists in the prior art wherein, in order to balance an inertial force arising from the reciprocating linear movement of the action means thereof in the vertical direction, an additional eccentric mass is providing on a rotary wheel, wherein the eccentric mass rotates together with the rotary wheel around a rotation axis of the rotary wheel.

As another example, there is also a reciprocating saw in the prior art which first of all comprises an eccentric mass similar to that described above, used for balancing an inertial force generated by the action means of the electric tool in a movement direction, to eliminate vibration caused by this inertial force. However, while balancing the inertial force of the action means in the vertical direction, this eccentric mass generates a force component in a horizontal direction perpendicular to the vertical movement direction, thereby triggering a vibration side effect again. In order to further reduce the vibration side effect triggered by the eccentric mass during operation, the saw is also provided with another counterweight apparatus used for balancing the inertial force component generated by the eccentric mass in the horizontal direction.

SUMMARY

An object of the present disclosure is to provide a novel electric tool structure having a vibration-reducing function, or at least to provide a user with a choice.

To this end, according to the present disclosure, an electric tool is provided, which may comprise a rotary wheel driven to rotate around its own central axis; an action member for bearing a cutter of the electric tool; and a counterweight, wherein the rotary wheel driven to rotate around the central axis drives the action member such that it reciprocates linearly in a first direction, at the same time driving the counterweight such that it not only reciprocates linearly in the first direction in an opposite manner to the action member but also performs reciprocating swinging movement in a plane perpendicular to the central axis, the first direction being parallel to the plane.

In the novel electric tool structure of the present disclosure, the counterweight does not perform rotational movement, but instead performs reciprocating swinging movement while moving linearly in an opposite manner to the action member of the electric tool. In particular, a centre of mass of the counterweight moves along an elliptical path. Since the swinging movement has a movement component in a direction perpendicular to the movement direction of the action member, the counterweight likewise generates an inertial force component in a perpendicular direction; in order to balance the inertial force component of the counterweight in this perpendicular direction, the rotary wheel of the electric tool according to the present disclosure is preferably designed in the form of an eccentric wheel. A centrifugal resultant force borne by the rotary wheel during rotation has a first inertial force component in a direction opposite to a direction of an inertial force of the action member and a second inertial force component in the perpendicular direction. The first inertial force component of the eccentric rotary wheel and an inertial force of the counterweight are together used to balance the inertial force of the action member; the second inertial force component of the eccentric rotary wheel is used to balance the inertial force component of the counterweight in the perpendicular direction.

In the novel electric tool according to the present disclosure, the inertial force of an action means in the reciprocating movement direction is balanced effectively through the provision of the counterweight, and the inertial force of the counterweight in the perpendicular direction perpendicular to the movement direction is balanced effectively by designing the rotary wheel to have an eccentric structure. Thus, in the reciprocating movement direction of the action member, the inertial force components of the counterweight and the rotary wheel are in the same direction and add together, so can together balance vibration generated by the action means; in the perpendicular direction, the inertial force components of the counterweight and the rotary wheel are in opposite directions and cancel each other out, so can reduce or eliminate vibration in the perpendicular direction. This structure reduces vibration arising in the electric tool effectively, avoiding the destruction of internal components due to vibration arising in the electric tool, and not only lengthens the service life of the electric tool but also enables the operator to perform operations comfortably.

BRIEF DESCRIPTION OF THE DRAWINGS

A better understanding of the abovementioned and other features and advantages of the present application can be gained from preferred embodiments of the present application which are described below in conjunction with the accompanying drawings, wherein.

DETAILED DESCRIPTION

As used herein, the term "electric tool" includes but is not limited to reciprocating electric saws such as jigsaws, and electric hammers, etc. Portable electric tools of other types suitable for the principle of the present disclosure are also included in the scope of the present disclosure, which scope is not limited in any way to the detailed structures and forms shown in the figures and described here, but is defined only by the claims.

Overall, an electric tool according to the present disclosure comprises a drive means outputting rotational movement, an action means performing reciprocating linear movement in a linear movement direction, and a movement conversion mechanism converting rotational movement from a drive component to reciprocating linear movement of an output component. In order to avoid or minimize vibration of the electric tool caused by an inertial force of the action means performing reciprocating linear movement, the electric tool of the present disclosure uses a novel movement conversion mechanism.

The novel movement conversion mechanism of the present disclosure mainly comprises a rotary wheel driven by a drive means, and a counterweight driven by the rotary wheel. The rotary wheel is driven by the drive means and rotates around its own rotation axis; the rotating rotary wheel drives the action means of the electric tool to perform reciprocating linear movement via a first drive part, and drives the counterweight to move via a second drive part. The rotary wheel is constructed as an eccentric rotary wheel, so that an inertial force generated by the rotation of the eccentric rotary wheel has a first inertial force component in the linear movement direction and a second inertial force component in a perpendicular direction perpendicular to the linear movement direction.

The counterweight comprises a frame engagement part offset from the centre of mass thereof, and the driving of the counterweight by the rotating rotary wheel not only causes the entire counterweight to slide in a reciprocating fashion relative to a frame of the electric tool in the linear movement direction in an opposite manner to the action means via the frame engagement part, but also causes the entire counterweight to pivot around the frame engagement part. The frame engagement part is located between the centre of mass of the counterweight and a corresponding engagement part engaged with the second drive part of the rotary wheel, and moves along an elliptical path; thus, a movement component of the counterweight in the linear movement direction generates a third inertial force component, and pivoting movement of the counterweight also generates a fourth inertial force component in the perpendicular direction.

The first inertial force component of the rotary wheel and the third inertial force component of the counterweight are both in the linear movement direction, and are in the opposite direction to the inertial force of the action means of the electric tool, such that the inertial force of the action means is balanced. The second inertial force component of the rotary wheel and the fourth inertial force component of the counterweight are of equal size but in opposite directions in the perpendicular direction, and cancel each other out, achieving the objective of eliminating vibration in the perpendicular direction.

The operating principle of the electric tool according to the present disclosure is explained in detail below with reference to the accompanying drawings, taking a jigsaw as an example. In the jigsaw example shown in the figures, the linear movement direction is a vertical direction, and the perpendicular direction is a horizontal direction perpendicular to the vertical direction. For convenience, the term "first direction" is used herein to indicate the reciprocating linear movement direction of the action means of the electric tool, and the term "second direction" is used herein to indicate a direction perpendicular to the first direction.

Figure 1:
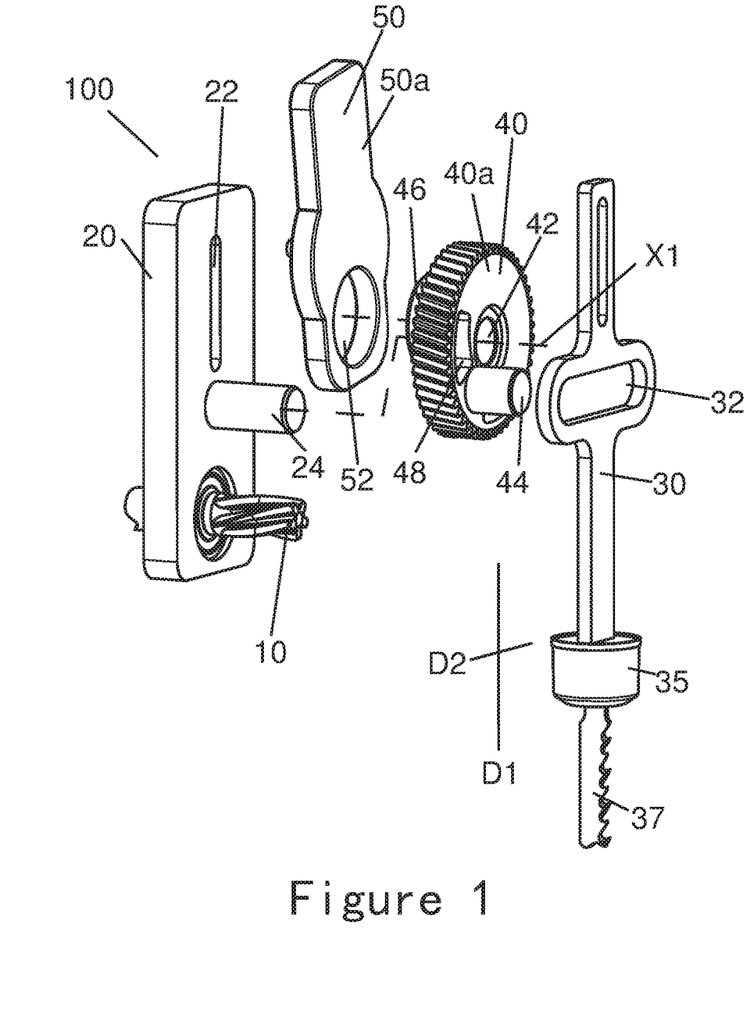
FIG. 1 is an exploded three-dimensional view of a part of a jigsaw according to the present disclosure.
Figure 2:
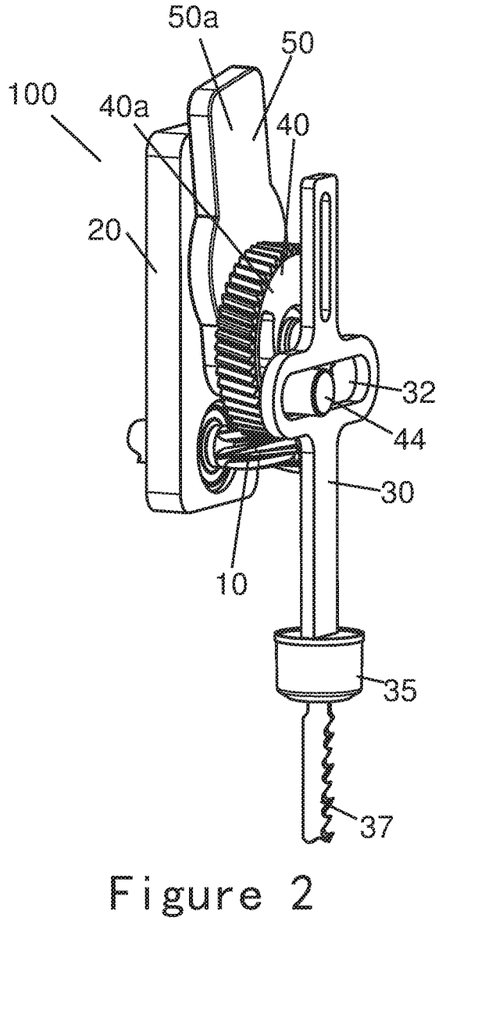
FIG. 2 is an assembled three-dimensional view of a part of a jigsaw according to the present disclosure.
Figure 3:
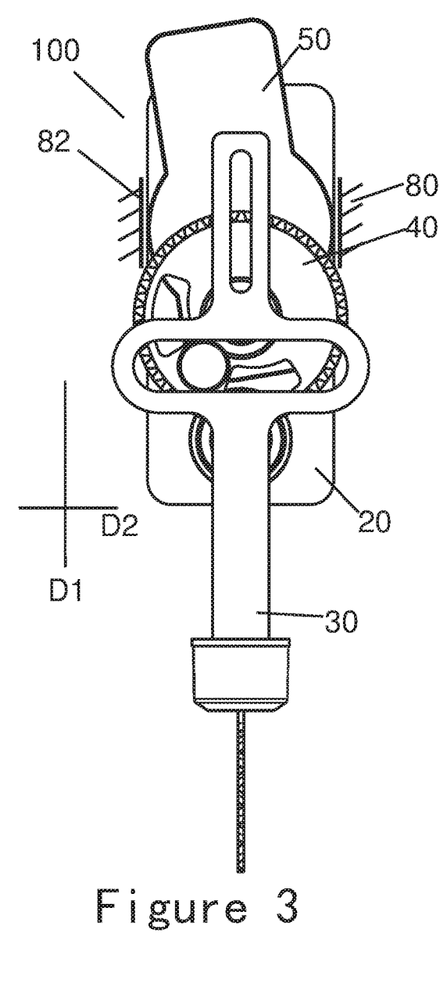
FIG. 3 separately shows a front view of a part of a jigsaw according to the present disclosure.
Figure 4:
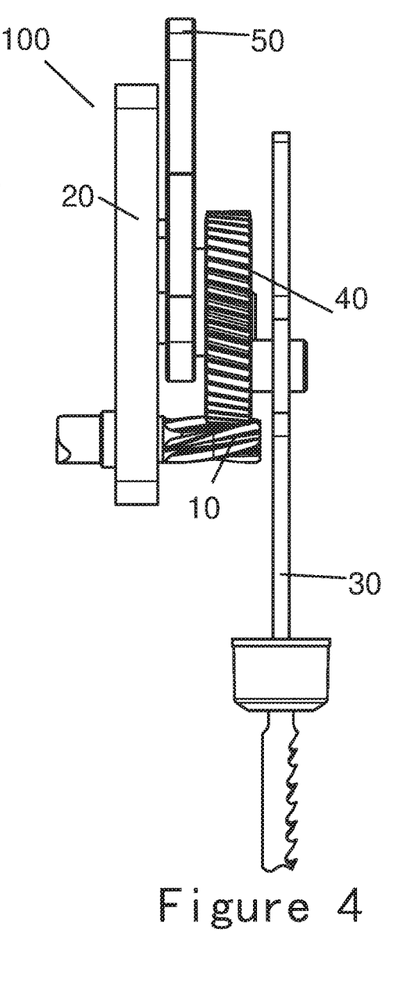
FIG. 4 separately shows a side view of a part of a jigsaw according to the present disclosure.
Figure 5:
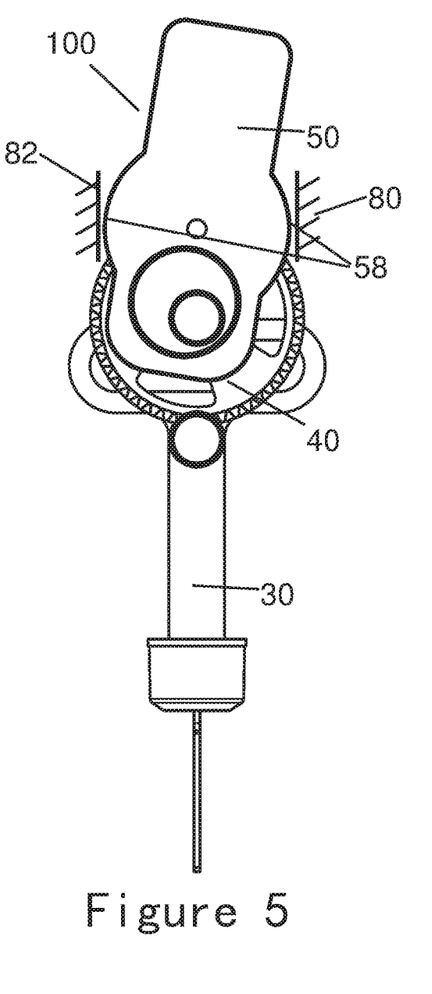
FIG. 5 separately shows a rear view of a part of a jigsaw according to the present disclosure.

FIGS. 1 and 2 show an exploded view and an assembled view respectively of a part of a jigsaw 100; FIGS. 3-5 show a front view, a side view and a rear view respectively of a part of the jigsaw 100. In the figures, a frame of the jigsaw 100 has been removed in order to show internal functional components of the jigsaw 100 clearly.

In order to show the innovative aspects of the present disclosure prominently, a drive means of the jigsaw 100 is not shown. However, those skilled in the art should understand that the drive means may be a drive means of any type known in the art, e.g. an electric motor, which outputs rotational movement via an output shaft 10. The output shaft 10 is furthermore supported by a support 20 fixed to the frame of the jigsaw 100. The support 20 for example takes the form of a support plate as shown in the figures, but is not limited thereto.

In the jigsaw 100 shown in the figures, an action means comprises an action member 30 supporting a cutter retainer 35, wherein the cutter retainer 35 is used for retaining a cutter of the jigsaw 100, specifically a saw blade 37. The action member 30 is configured to reciprocate linearly in a first direction D1 relative to the frame of the electric tool.

The novel movement conversion mechanism of the present disclosure comprises a rotary wheel 40 driven by the output shaft 10 of the drive means, and a counterweight 50 driven by the rotary wheel 40.

The rotary wheel 40 has a central support hole 42; a wheel support shaft 24 extending from the support 20 passes through the support hole 42 and supports the rotary wheel 40, such that the rotary wheel 40 can rotate around a central axis X1 defined by the support hole 42.

In the direction of the central axis X1 of the rotary wheel 40, the rotary wheel 40 defines a first side 40a facing towards the action member 30 and an opposite second side 40b, and comprises a first protrusion 44 extending from the first side 40a towards the action member 30 and a second protrusion 46 extending from the second side 40b away from the action member 30. The first protrusion 44 is adapted to be received in a hole 32 formed in the action member 30. The second protrusion 46 is adapted to be received in a hole 52 formed in the counterweight 50.

As shown in the figures, in the direction of the central axis X1 of the rotary wheel 40, the counterweight 50 defines a first side 50a facing towards the rotary wheel 40, i.e. towards the action member 30, and an opposite second side 50b, with the hole 52 being sunk into the counterweight 50 from the first side 50a; as shown in the figure, the hole 52 may extend from the first side 50a to the second side 50b and thereby define a through-hole, but optionally, it is also possible for the hole 52 to not run through a body of the counterweight 50. The counterweight 50 also comprises a protrusion 54 extending from the second side 50b thereof; the protrusion 54 is received in a hole 22 formed in the support 20, the hole 22 being elongated in the first direction D1.

Figure 6A:
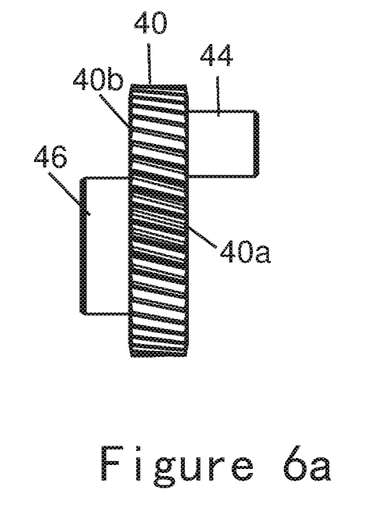
FIGS. 6a-6b show a side view and a front view of an example of a rotary wheel of a jigsaw of the present disclosure.
Figure 6B:
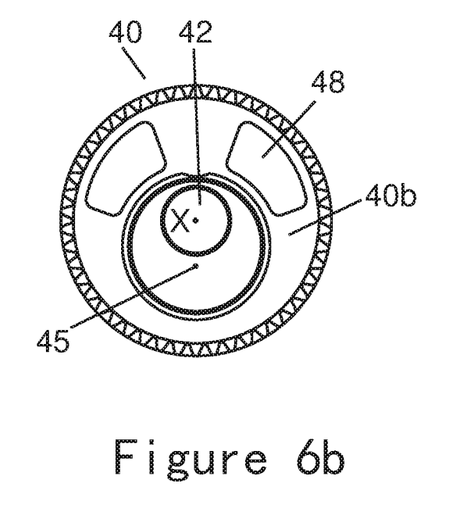
Figure 7A:
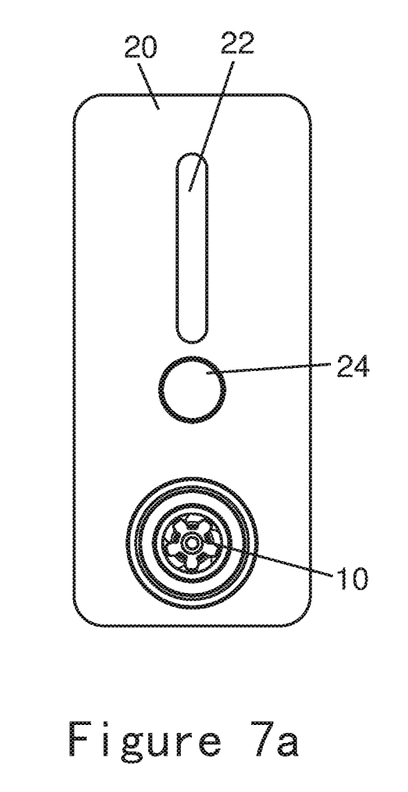
FIGS. 7a-7b show a front view and a side view of an example of a support of a jigsaw of the present disclosure.
Figure 7B:
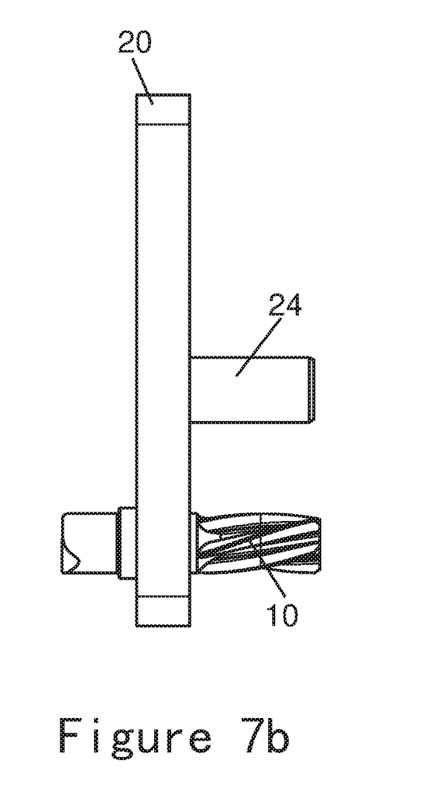

According to a novel aspect of the present disclosure, as shown in FIGS. 6a-6b, the first protrusion 44 and the second protrusion 46 of the rotary wheel 40 are located at two opposite sides in a diametric direction of the rotary wheel 40, i.e. are arranged opposite each other in a diagonal fashion. In addition, the rotary wheel 40 is specially designed such that the centre of mass 45 thereof is offset from the central axis defined by the central hole 42 in a direction away from the first protrusion 44. In other words, as shown in the front view in FIG. 6b, in an orthogonal plane perpendicular to the central axis X1 of the rotary wheel 40, in a diametric direction through a point of intersection X of the central axis X1 of the rotary wheel 40 and the orthogonal plane, a projection of the geometric centre of the second protrusion 46 on the orthogonal plane and a projection of the centre of mass 45 of the rotary wheel 40 on the orthogonal plane are both located at a side opposite to a projection of the geometric centre of the first protrusion 44 on the orthogonal plane in relation to the point of intersection X. Optimally, the projections of the geometric centre of the second protrusion 46, the geometric centre of the first protrusion 44 and the centre of mass 45 of the rotary wheel 40 on the orthogonal plane and the point of intersection X lie on a common straight line; thus, the geometric centre of the second protrusion 46, the geometric centre of the first protrusion 44, the centre of mass 45 of the rotary wheel 40 and the central axis X1 of the rotary wheel 40 are all located in a common plane perpendicular to the orthogonal plane.

Specifically, the eccentric rotary wheel 40 may be realized in at least one of the following manners: giving the second protrusion 46 extending from the second side 40b a larger mass than the first protrusion 44 extending from the first side 40a; providing one or more depressions or through-holes 48 at a side of the rotary wheel 40 that is close to the first protrusion 44, in order to reduce the mass at the side where the first protrusion 44 is located; adding a protrusion at a side of the second protrusion 46 in order to increase the mass at the side where the second protrusion 46 is located. In an embodiment shown in the figures, two through-holes 48 arranged in a mirror-image fashion relative to the common plane containing the common straight line are provided. Of course, any other manners not set out above may be employed.

Figure 8A:
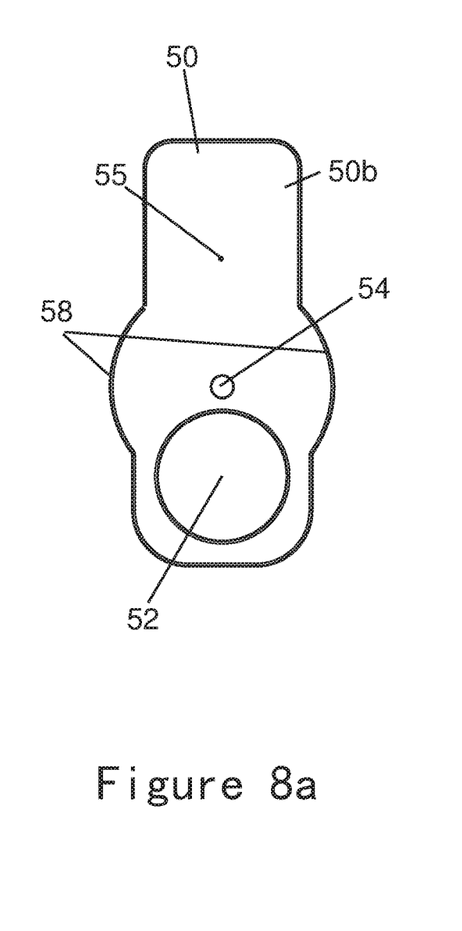
FIGS. 8a-8b show a front view and a three-dimensional view of an example of a counterweight of a jigsaw of the present disclosure.
Figures 8B, 9:
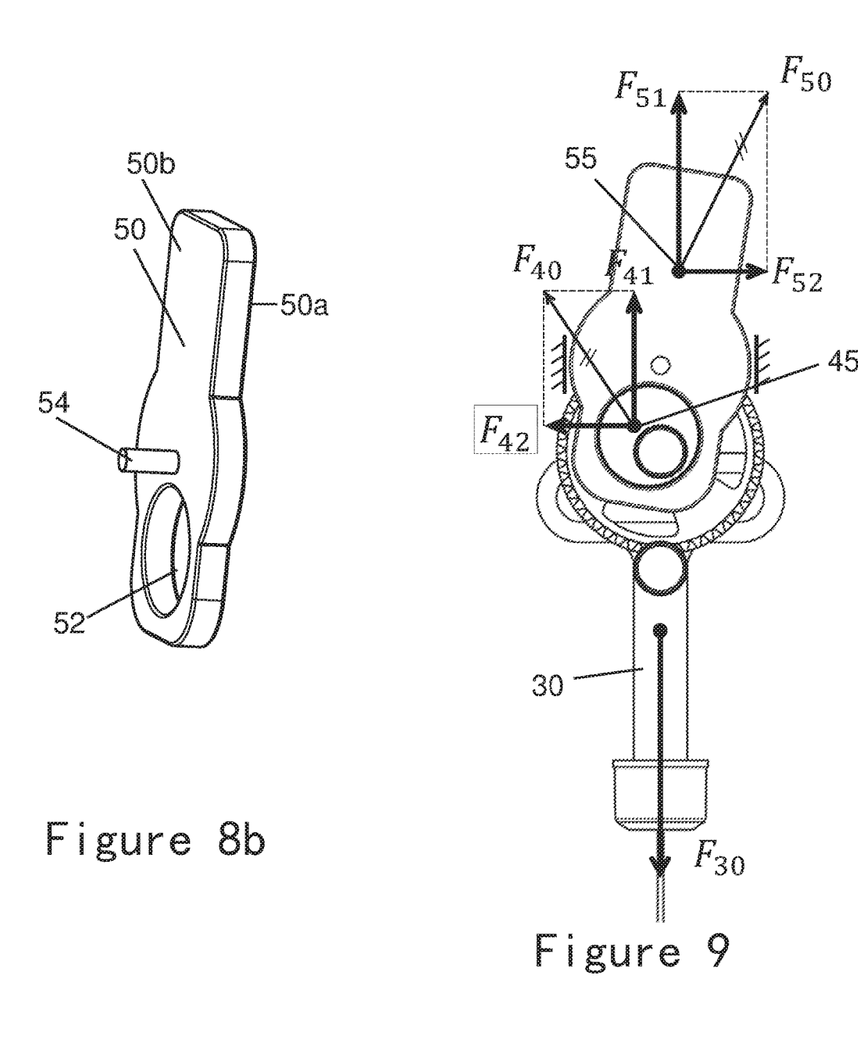
FIG. 9 shows a force relationship diagram corresponding to the position in FIG. 5.

According to a novel aspect of the present disclosure, as shown in FIGS. 8a-8b, the centre of mass 55 of the counterweight 50 is offset from the centre of the hole 52 receiving the second protrusion 46 of the rotary wheel 40 and from the centre of the protrusion 54. In the case of the counterweight 50, projections of the centre of mass 55 and the centre of the hole 52 on the orthogonal plane or a plane parallel to the orthogonal plane are located on two opposite sides respectively of a projection of the centre of the protrusion 54 on the orthogonal plane or a plane parallel to the orthogonal plane. For example, this may be realized in at least one of the following manners: increasing the size of the hole 52 in order to reduce the mass at the side where the hole 52 is located; increasing the mass at the side opposite the hole 52. Of course, any other structure which causes the centre of mass 55, the protrusion 54 and the hole 52 to have the abovementioned positional relationship may be used.

Using the structure as described above, when the output shaft 10 of the drive means drives the rotary wheel 40 such that it rotates around the central axis X1 thereof, the first protrusion 44 and the second protrusion 46 disposed at two opposite sides of the central axis X1 of the rotary shaft 40 and offset from the central axis X1 thereof will each revolve around the central axis X1 of the rotary wheel 40, at the same time driving the action member 30 and the counterweight 50 respectively to move.

At the first side 40a, when the first protrusion 44 is revolving around the central axis X1 of the rotary wheel 40, a movement component in the first direction D1 results in the first protrusion 44 pushing the action member 30 to move in the first direction D1, and a movement component in a second direction D2 perpendicular to the first direction D1 results in the first protrusion 44 sliding in the hole 32 of the action member 30.

At the second side 40b, when revolving around the central axis X1 of the rotary wheel 40, the second protrusion 46 drives the counterweight 50 to move, and the hole 52 of the counterweight 50 rotates around the central axis X1 of the rotary wheel 40. At the same time, the protrusion 54 of the counterweight 50 slides along the hole 22 of the support 20 in the first direction D1, and the counterweight 50 pivots around the protrusion 54, specifically around a pivot axis defined by the protrusion 54, swinging in a special manner.

For example, referring to FIG. 5 (consistent with the analysis of forces borne hereinbelow), taking clockwise rotation of the rotary wheel 40 as an example, the first protrusion 44 is driving the action member 30 such that it moves downwards, and at an opposite side relative to the central axis X1 of the rotary wheel 40, the second protrusion 46 is driving the counterweight 50 to move; at this time the counterweight is pivoting around the protrusion 54 while moving upwards, and the centre of mass 55 of the counterweight 50 is moving towards the top right/left.

FIG. 9 shows a force relationship diagram corresponding to the position shown in FIG. 5. As shown in FIG. 9, at this moment, the rotary wheel 40 is rotating clockwise, therefore the first protrusion 44 and the action member 30 of the jigsaw 100 are about to move from a middle position of reciprocating movement to a lowermost position; the downward movement of the action member slows down, the direction of acceleration being upwards, and due to the fact that the direction of inertial force is opposite to the direction of acceleration, the direction of an inertial force F30 of the action member 30 is downwards; in the case of the rotary wheel 40, an inertial centrifugal force F40 at the centre of mass 45 thereof is directed towards the top left; in the case of the counterweight 50, since the movement directions of the second protrusion 46 driving the counterweight 50 and the first protrusion 44 driving the action member 30 are precisely opposite, the counterweight 50 is about to move from a middle position of reciprocating movement to an uppermost position, decelerating in an upward direction, with the acceleration being directed downwards, and therefore has an upward inertial force component F51; at the same time, the centre of mass 55 thereof is about to move from a rightmost position to a middle position of left-right swinging, accelerating leftwards, with the acceleration being directed leftward, and therefore has a rightward inertial force component F52; the direction of an overall inertial force F50 at the centre of mass 55 thereof is towards the top right.

Clearly, a component F41 of the inertial force F40 of the rotary wheel 40 in the first direction D1 and the component F51 of the inertial force F50 of the counterweight 50 in the first direction D1 are in the same direction, both being in the opposite direction to the inertial force F30 of the action member 30 in the first direction D1, therefore the inertial force F30 of the action member 30 is balanced by the sum of the component F41 of the inertial force F40 of the rotary wheel 40 in the first direction D1 and the component F51 of the inertial force F50 of the counterweight 50 in the first direction D1. In the second direction D2, a component F42 of the inertial force F40 of the rotary wheel 40 in this direction is opposite to the component F52 of the inertial force F50 of the counterweight 50 in this direction, and the two components cancel each other out.

Thus, according to the principle of the present disclosure, due to the rational arrangement of the positions of the centres of mass of the rotary wheel 40 and the counterweight 50, at any moment during operation of the jigsaw 100, and at any position of rotation of the rotary wheel 40, the components of the inertial forces of the rotary wheel 40 and the counterweight 50 in the first direction D1 are in the same direction, and the sum of the two components cancels out the inertial force of the action member 30 in this direction; from this perspective, compared with an existing structure in which the inertial force of an action member is balanced by a counterweight alone, the counterweight mass needed is greatly reduced, and the mass of the electric tool is correspondingly reduced. The components of the inertial forces of the rotary wheel 40 and the counterweight 50 in the second direction D2 are in opposite directions, and are of equal size, so the two components cancel each other out; from this perspective, in order to produce an eccentric rotary wheel realizing this function, a portion of material may be removed from the rotary wheel, e.g. the holes 48 in the figures; this reduces the mass of the rotary wheel, and correspondingly reduces the mass of the electric tool. At the same time, as stated above, most importantly, the inertial forces in the first direction and the second direction of moving components of the jigsaw 100 having this structure are all balanced, reducing and even eliminating any vibration which might arise.

In the structure of the present disclosure, due to the provision of the protrusion 54 received by the long hole 22 of the support 20, the counterweight 50 not only slides in the first direction D1 but also pivots around the protrusion 54. As an optional feature or as an additional feature, the counterweight 50 may also comprise another feature capable of sliding and pivoting relative to the frame of the jigsaw 100. In an embodiment shown in the figures, the other feature is an arc-shaped outer contour 58 concentric with the centre of a cylinder forming the protrusion 54, e.g. two arc-shaped outer contours 58 arranged opposite each other. Correspondingly, on a frame 80 of the jigsaw 100, an engagement part 82 for receiving the arc-shaped outer contour 58 may also be formed on the support 20 for example, such that the counterweight 50 can slide in the first direction D1 relative to the frame 80 of the jigsaw 100 in such a way that the arc-shaped outer contour 58 abuts the inside of the engagement part 82, and such that the counterweight 50 can pivot around the centre of the arc-shaped outer contour 58. Thus, the counterweight 50 can work according to the same principle as that described above.

In the electric tool of the present disclosure described taking the jigsaw 100 as an example, the inertial force of the action member 30 in the reciprocating movement direction is balanced effectively through the provision of the counterweight 50, and the inertial force of the counterweight 50 in the perpendicular direction perpendicular to the movement direction is balanced effectively by designing the rotary wheel 40 to have an eccentric structure. This structure reduces vibration arising in the electric tool effectively, avoiding the destruction of internal components due to vibration arising in the electric tool, and not only lengthens the service life of the electric tool but also enables the operator to perform operations comfortably.

As an alternative embodiment to the preferred embodiments of the jigsaw 100 described above, the jigsaw 100 may comprise at least one of the following features:

the support 20 is not limited to the plate-like member shown in the figures, but may have any structural form; optionally, it may be a part of the frame of the jigsaw 100;

the shape, quantity and arrangement of the hole(s) 48 of the rotary wheel 40 may be different from the shape, quantity and arrangement shown in the figures;

Any one of the hole 48 in the rotary wheel 40, the hole 32 in the action member 30, the hole 52 in the counterweight 50 and the hole 22 in the support 20 may be a through-hole; optionally, any one of them may be a non-through-hole;

for simplicity, the first protrusion 44, the second protrusion 46 and the protrusion 54 are all shown as cylindrical protrusions in the figures, but those skilled in the art will understand that any other optional structure having the same function could also be used;

as an alternative embodiment to the second protrusion 46 and the hole 52, the counterweight may comprise a protrusion, and the rotary wheel may comprise a hole receiving the protrusion.

Preferred embodiments of the present disclosure have been described above, but the present disclosure is not intended to be limited to the embodiments described above and shown schematically in the accompanying drawings. Without deviating from the substance and scope defined by the following claims, those skilled in the art could make various amendments and changes to the structural details and form of the embodiments above.

The invention claimed is:

1. An electric tool, comprising:
a rotary wheel configured to be driven to rotate around a central axis thereof;
an action member configured to bear a cutter of the electric tool; and
a counterweight,
wherein the rotary wheel is configured to (i) drive the action member such that the action member reciprocates linearly in a first direction and (ii), at the same time, drive the counterweight such that the counterweight not only reciprocates linearly in the first direction in an opposite manner to the action member, but also performs reciprocating swinging movement in a plane perpendicular to the central axis, the first direction being parallel to the plane.

2. The electric tool according to claim 1, wherein the reciprocating swinging movement is performed around a pivot axis perpendicular to the plane.

3. The electric tool according to claim 2, wherein the counterweight comprises a sliding part configured to slide relative to a frame of the electric tool, the sliding part defining the pivot axis.

4. The electric tool according to claim 3, wherein one or more of:
the sliding part comprises a protrusion extending from the counterweight, the centre of the protrusion being located on the pivot axis and correspondingly, the frame having a long slot configured to receive the protrusion, the long slot extending in the first direction, and the sliding part comprises an arc-shaped outer contour of the counterweight, the centre of the arc-shaped outer contour being located on the pivot axis and, correspondingly, the frame having a mating part configured such that the arc-shaped outer contour moves linearly in abutment in the first direction.

5. The electric tool according to claim 2, wherein the rotary wheel comprises a counterweight drive part configured to drive the counterweight, wherein the counterweight comprises a drive engagement part engaged with the counterweight drive part, and wherein, in the plane, a point of intersection of the pivot axis and the plane is located between a projection of a centre of mass of the counterweight on the plane and a projection of the centre of the drive engagement part on the plane.

6. The electric tool according to claim 5, wherein the rotary wheel further comprises an action member drive part configured to drive the action member, and wherein projections of the centre of the counterweight drive part and a centre of mass of the rotary wheel on the plane are both located at a side opposite to a projection of the centre of the action member drive part on the plane relative to a point of intersection of the central axis of the rotary wheel and the plane.

7. The electric tool according to claim 6, wherein at a side that is close to the action member drive part relative to the central axis of the rotary wheel, the rotary wheel defines a depression or a hole such that the rotary wheel has a mass eccentric structure defined by the depression or the hole.

8. The electric tool according to claim 6, wherein the action member drive part and the counterweight drive part both extend directly from the rotary wheel.

9. The electric tool according to claim 1, wherein the rotary wheel is an eccentric wheel, and a centrifugal resultant force borne by the rotary wheel during rotation has a force component in a direction opposite to a direction of an inertial force of the action member and a force component in a second direction perpendicular to the first direction.

10. The electric tool according to claim 1, wherein the electric tool is a reciprocating saw.

* * * * *